United States Patent Office.

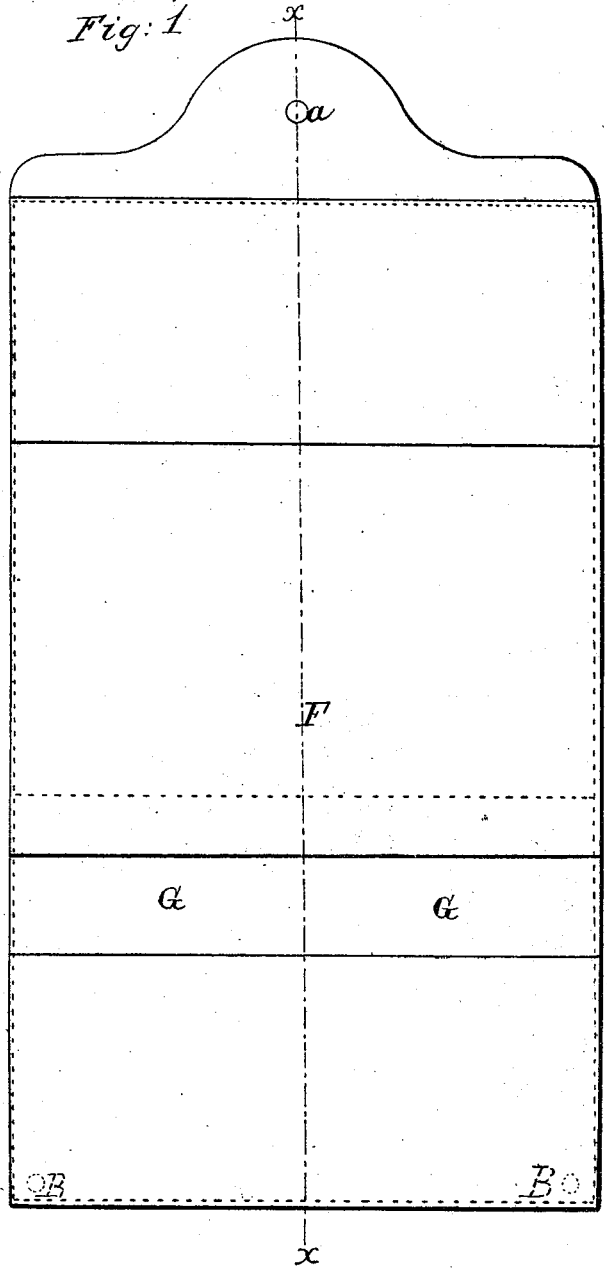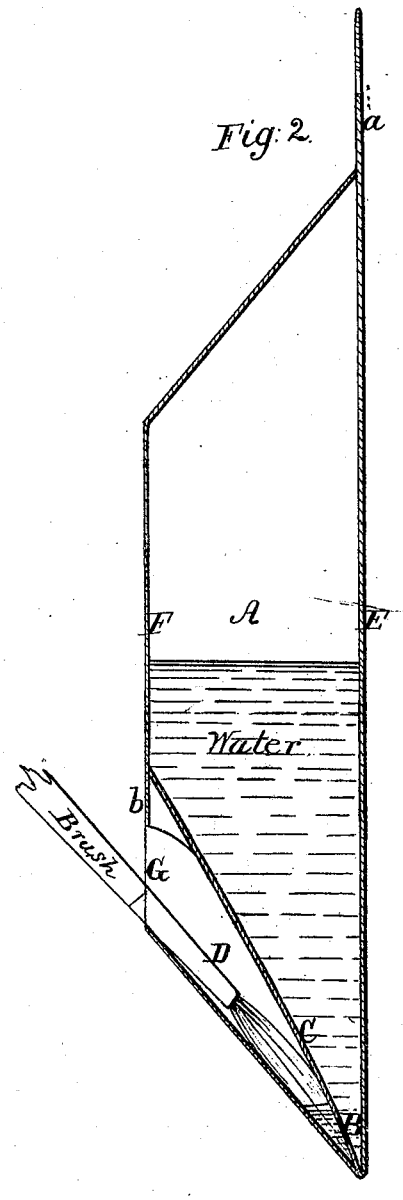

HENRY THOMAS DAVIS, OF NEW CROSS, GREAT BRITAIN.

*Letters Patent No. 84,538, dated December 1, 1868.*

DAMPING-TROUGH.

The Schedule referred to in these Letters Patent and making part of the same.

*To all whom it may concern:*

Be it known that I, HENRY THOMAS DAVIS, of Hatcham Park, New Cross, Surrey, in the Kingdom of Great Britain, have invented "a new and useful Damping-Apparatus for Copying Letters;" and I do hereby declare that the following is a full and exact description thereof, reference being had to the accompanying sheet of drawings, and to the letters of reference marked thereon.

The nature of my invention consists in the combination of a trough or receptacle to receive and hold the damping-brush of a letter-copying press, with an atmospheric reservoir or fount, in such a manner as that the brush may be kept constantly moist and damp with clean water, protected from dust and dirt, the whole constituting a new and useful apparatus for holding and moistening the damping-brush of a letter-press.

In the accompanying drawings—

Figure 1 is a front view of the fount or reservoir, and

Figure 2 represents a section of the same on the line $x\ x$ of fig. 1.

Similar letters indicate like parts in each of the figures.

My improved apparatus is constructed of a fount or reservoir, A, of tin, porcelain, or other suitable material, made air and water-tight, and having an angular trough or basin, D, formed along its lower side, at such an angle as shall enable it to support properly a damping-brush placed therein.

One or more small apertures, B, are pierced through the lower plate C of the fount, which separates it from the supporting and moistening-trough D, affording communication between the bottom of the trough and the interior of the fount A.

Water or other liquid is introduced into the interior of the fount through these apertures B. The water is poured into the trough, and the apparatus is held in such a manner that one of the apertures is left uncovered, to allow the air to escape through the same, while the water flows through the others, and fills the interior of the fount.

When the apparatus is used, the pressure of the atmosphere retains the water within the fount, sufficient only passing into the bottom of the trough to moisten the brush placed therein, and this whether the apparatus be suspended by the hole $a$, or whether it rests upon its base, E.

The front plate F of the fount is extended a little below the upper edge of the trough, so as to partially cover the opening thereof, and form a ledge, $b$, which prevents the escape of water therefrom when the apparatus is being filled, and also affords a means of removing the surplus moisture from the damper before applying it to the surface of the letter.

Instead of two apertures B in the plate C of the fount, one will suffice. In such case, however, care must be observed, in filling the fount, to hold the apparatus in such a manner that a portion of the said aperture be left uncovered, to allow the air to escape as the water flows into the fount.

Having thus fully described my invention,

What I claim therein as new, and desire to secure by Letters Patent, is—

An apparatus for supporting and moistening the damper or brush of a letter-copying press, when constructed and arranged substantially as herein set forth.

HENRY THOMAS DAVIS.

Witnesses:
 GEORGE HASELTINE,
 WILLIAM ROBERT LAKE,
  *"International Patent Office,"*
   8 *Southampton Buildings, London.*